A. W. EPRIGHT.
SCALE RELIEVING GEAR.
APPLICATION FILED SEPT. 18, 1909.
964,854.
Patented July 19, 1910.
4 SHEETS—SHEET 1.
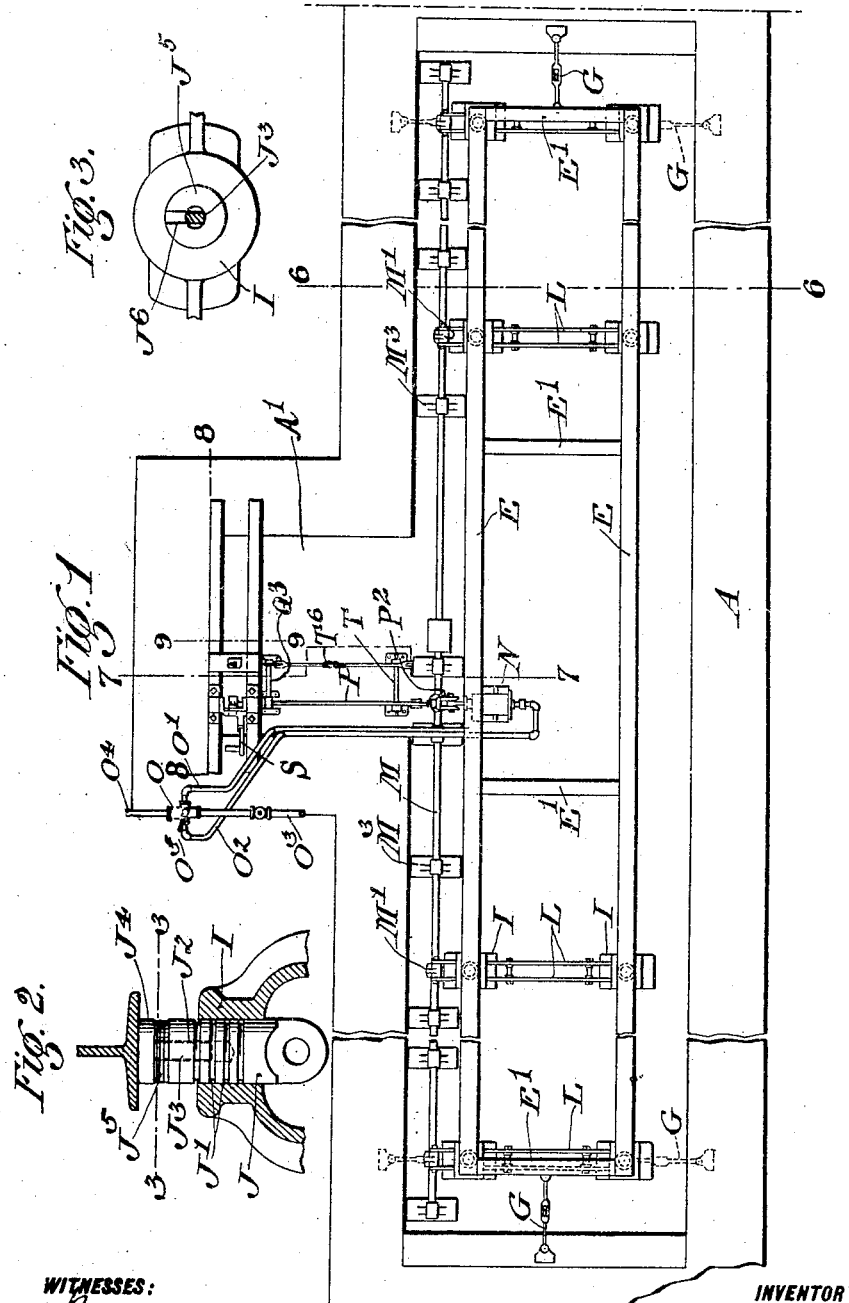

A. W. EPRIGHT.
SCALE RELIEVING GEAR.
APPLICATION FILED SEPT. 18, 1909.
964,854.
Patented July 19, 1910.
4 SHEETS—SHEET 2.
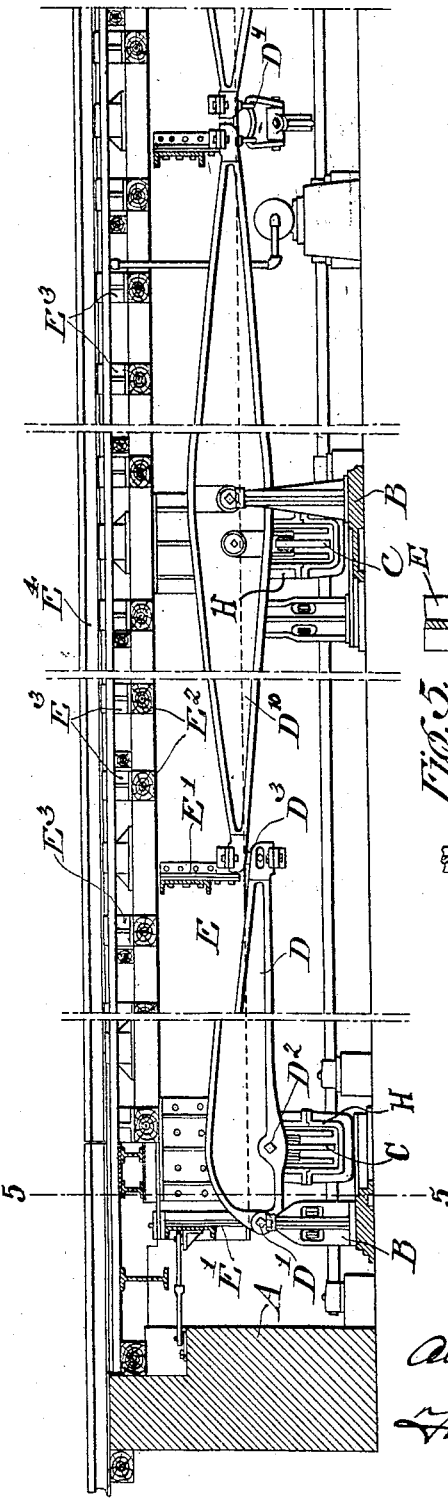
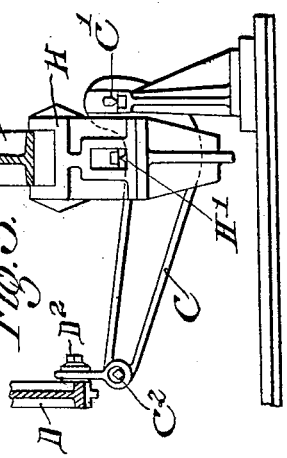
WITNESSES:
INVENTOR
BY
his ATTORNEY.

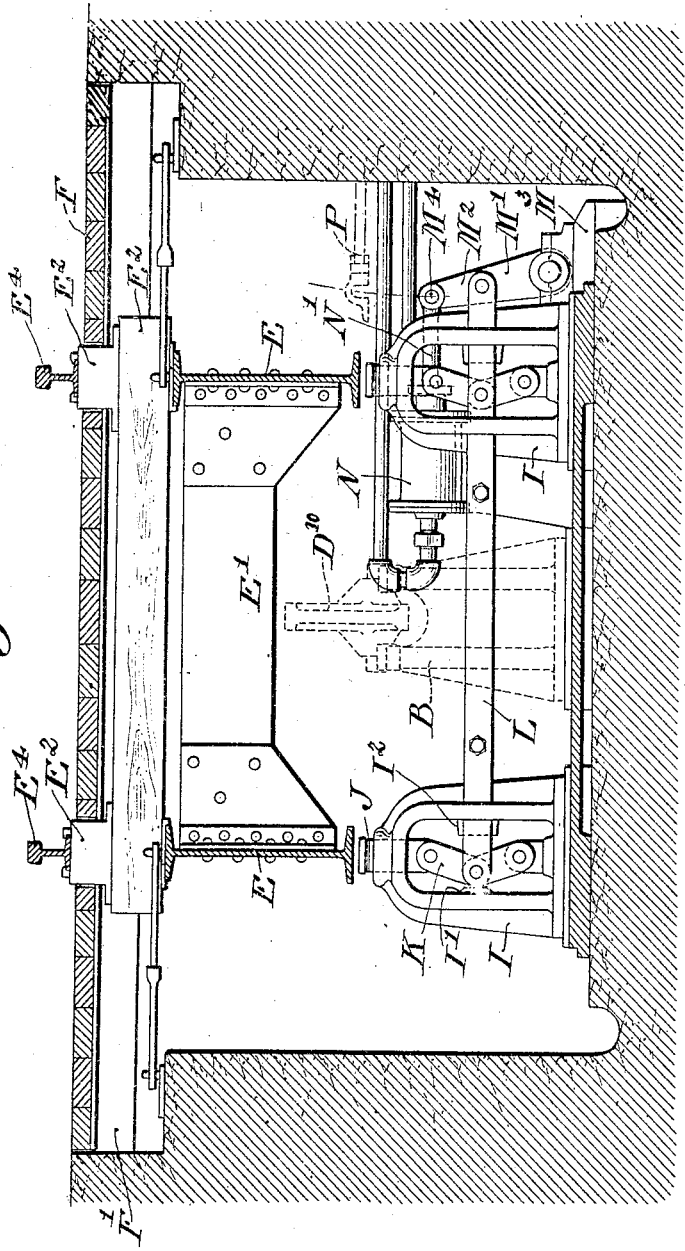

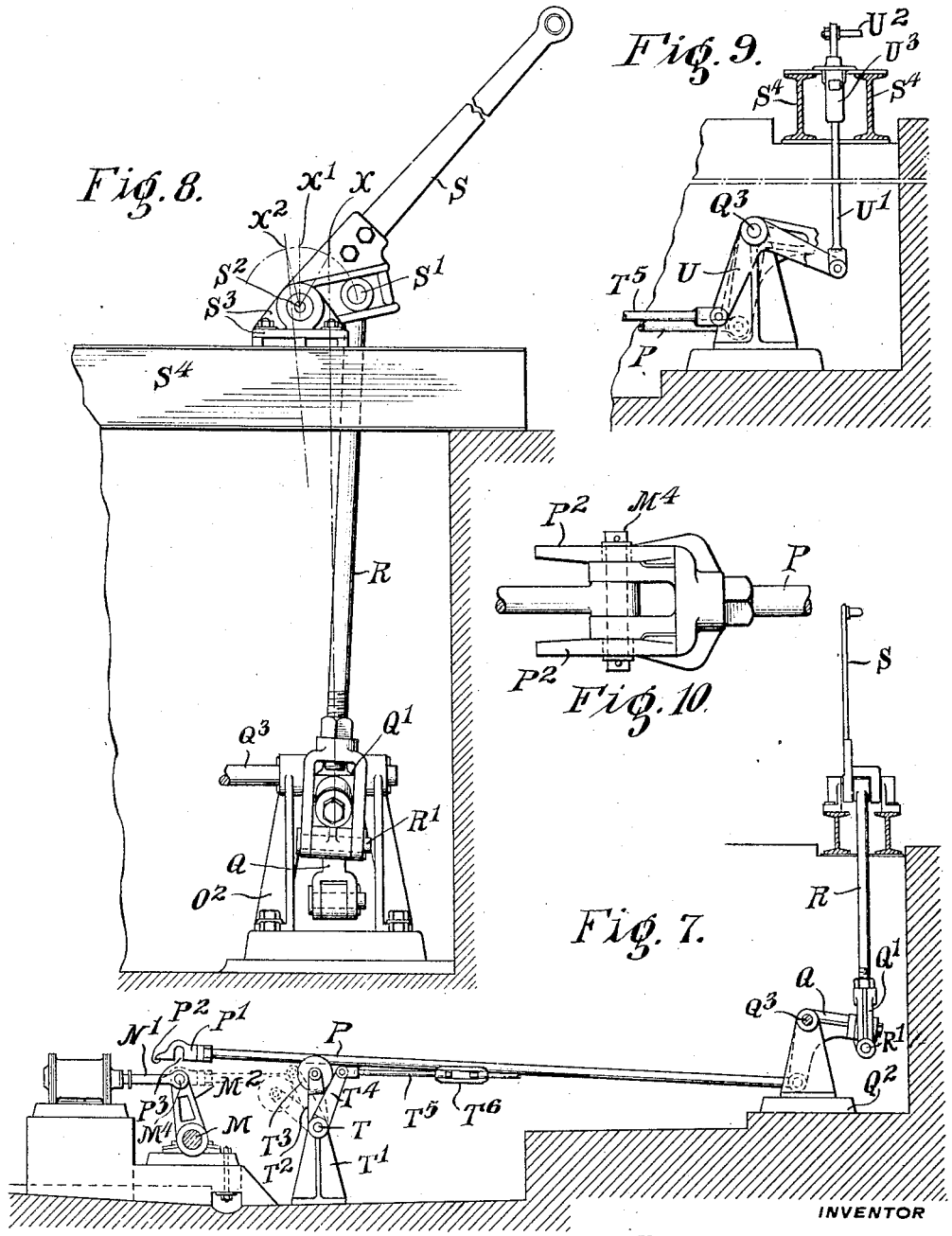

UNITED STATES PATENT OFFICE.

ALONZO W. EPRIGHT, OF ALTOONA, PENNSYLVANIA, ASSIGNOR OF ONE-THIRD TO HIMSELF, ONE-THIRD TO AXEL S. VOGT, AND ONE-THIRD TO JOHN BOUSFIELD, OF ALTOONA, PENNSYLVANIA.

SCALE-RELIEVING GEAR.

964,854.   Specification of Letters Patent.   Patented July 19, 1910.

Application filed September 18, 1909. Serial No. 518,370.

*To all whom it may concern:*

Be it known that I, ALONZO W. EPRIGHT, a citizen of the United States of America, residing in Altoona, in the county of Blair and State of Pennsylvania, have invented a certain new and useful Improvement in Scale-Relieving Gear, of which the following is a true and exact description, reference being had to the accompanying drawings, which form a part thereof.

The present invention relates to weighing scales, and particularly to large platform weighing scales for weighing heavy objects, and the invention is especially adapted for use in connection with scales for weighing railway cars.

The object of the invention is the provision in a scale of the type specified, of a simple, effective and reliable gear for taking the weight of the platform and its load off the scale levers when desirable, as when loads too heavy to be weighed with safety, or which it is not desired to weigh pass over the scale. For instance, it is highly desirable if not absolutely necessary, to avoid subjecting the scale levers and pivot bearings of an ordinary railway car scale to the weight of the locomotives employed for moving the cars. Heretofore in the case of railway car scales, it has been common to provide a separate track for the locomotive, the track having its rails laterally displaced a few inches from the rails of the car track and being supported independently of the scale levers. With my invention, when the relieving gear is brought into operation, locomotives may be passed with impunity over the car track proper of the scale and hence the necessity for a separate locomotive track is avoided. The omission of a separate locomotive track is a convenience and reduces the expense of construction, and the omission of this track also facilitates the rapid handling of the cars to be weighed. It frequently happens also, that it is necessary or desirable to weigh only a comparatively small proportion of the cars composing a train. In such cases the ability to pass the cars one after the other over the scale platform supported track section without subjecting the scale levers and bearings to wear and shock from the passage of the cars not weighed and without requiring any backing or switching of cars or other interference with the regular travel of the cars over the scale forms an important and highly desirable feature.

The various features of novelty which characterize my invention are pointed out with particularity in the claims annexed to and forming a part of this specification. For a better understanding of the invention, however, and the advantages possessed by it, reference may be had to the accompanying drawings and descriptive matter in which I have illustrated one of the forms in which the invention may be embodied.

Of the drawings: Figure 1 is a plan view of the scale with the scale levers and the floor covering them removed to facilitate an understanding of the parts shown. Fig. 2 is a partial sectional elevation of a portion of one of the relieving jacks employed. Fig. 3 is a section on the line 3—3 of Fig. 2. Fig. 4 is a longitudinal sectional elevation of a portion of the scale shown in Fig. 1. Fig. 5 is a transverse sectional elevation, on the line 5—5 of Fig. 4, showing a portion of the scale mechanism. Fig. 6 is a transverse sectional elevation on the line 6—6 of Fig. 1, with the scale levers partly omitted and partly shown in dotted lines in order not to complicate the showing of the relieving gear. Fig. 7 is a partial sectional elevation on the line 7—7 of Fig. 1. Fig. 8 is a partial section on the line 8—8 of Fig. 1. Fig. 9 is a partial section on the line 9—9 of Fig. 1, and Fig. 10 is a plan showing a detail of construction.

In the drawings, A represents the wall of the scale pit, B the fulcrum blocks or pedestals supporting the transverse scale levers C and the longitudinal scale levers D, on which in turn the scale platform is supported. As shown, the scale platform proper comprises the main longitudinal beams E, arranged one beneath each track rail $E^4$, cross braces or members E' connecting the beams E, cross ties $E^2$, and chairs $E^3$ projecting through openings in the stationary floor F and supporting the track rails $E^4$ above the flooring F. The flooring F is supported on stationary beams F' supported at their ends by the walls of the scale pit.

In the track scale shown, the platform beams are supported at intervals along their length on members H supported through knife edge pivot connections H by the levers C. The latter are fulcrumed on the appropriate fulcrum blocks B by the knife edge pivot bearings C'. The long ends of the levers C are connected to the appropriate levers D by connections which include the knife edge pivot $D^2$ and $C^2$. Each lever D, at the end of the scale, is fulcrumed at D' and is connected to one end of the corresponding intermediate lever $D^{10}$ by connections $D^3$ including a plurality of knife edge pivot bearings and the intermediate levers $D^{10}$ are connected to the scale beam as indicated in part at $D^4$ by connections including a plurality of knife edge pivot bearings.

The means employed for taking the weight of the scale platform and its load off the scale levers and the various knife edge bearings comprises a plurality of lifting jacks I and means for simultaneously operating them. In the form shown, each jack I comprises a stationary frame member having a yoke like upper portion in which is slidingly received a plunger J. Each plunger J is provided, in the form shown, with a plurality of oil grooves J' and is formed at its upper end with a vertical socket $J^2$ in which is received the stem $J^3$ of a cap piece $J^4$. Washers $J^5$ are placed between the underside of the cap piece $J^4$ and the upper end of the plunger J. As shown, the stem $J^3$ is in the form of a flattened cylinder, and a notch $J^6$ is formed in one side of each washer. The width of the notch $J^6$ is less than the diameter of the cylinder hole in the washer, but is great enough to receive the flattened stem $J^3$ when the parts are in the relation shown in Fig. 3. The diameter of the central hole in the washer is great enough to permit the washer to be turned on the stem $J^3$ and thereby locked in place after the washer has been pushed onto the stem. The lower end of each plunger J is pivotally connected to the upper one of a pair of toggle link members K. The lower end of the lower toggle link member K is pivotally connected to the frame member of the jack. The two link members K of each toggle are pivotally connected to each other and to a pair of bars L. The jacks I are arranged in pairs at intervals along the length of the scale platform with the plunger J of one jack of each pair beneath one of the scale platform beams E, and the plunger J of the other jack of the pair under the other beam E. At one side of the scale the bars L are extended through the frames of the corresponding jacks and are pivotally connected to arms M' secured to a rock shaft M. The rock shaft M is journaled in bearing blocks $M^3$ firmly anchored in place at the bottom of the scale pit and extends parallel to the length of the scale. Between its ends the rock shaft M, is provided with an arm $M^2$ which is connected in the form shown to the piston stem N' of a fluid pressure actuating device N. The cylinder of the fluid pressure actuating device N is connected at its opposite ends by pipes O' and $O^2$ to a valve casing O, and the latter is connected in turn by pipe $O^3$ to a source of fluid under pressure, as compressed air, and to an exhaust pipe $O^4$. By turning the operating handle $O^5$ of the valve O, either end of the cylinder of the device N may be connected to the supply pipe $O^3$, while at the same time the opposite end of the cylinder is connected to exhaust. By manipulating the handle $O^5$ of the valve O, the rock shaft may thus be thrown in one direction to move the plunger J into engagement with the beams E and lift the platform and its load off the scale levers, or in the other direction to permit the weight of the scale platform and its load to be taken by the scale levers. Stop lugs $I^2$ limit the movements of the knuckle joints of the links K.

In order to insure the possibility of operating the relieving gear when the power connections for effecting this operation fail, as from a lack, at any time, of a sufficient supply of compressed air or other operating fluid, I prefer to make provisions for the operation of the relieving gear by hand. In the form of the apparatus shown, a connecting rod P is provided which may be quickly connected to, or disconnected from, the lever arm $M^2$. The rod P is connected to a suitable hand lever mechanism suitably disposed and arranged to have sufficient stroke of its actuating member proper to insure the proper lifting force for moving the platform through the very slight vertical distance necessary to relieve the scale bearings and levers from the weight of the platform and its load. To facilitate this the pivot pin $M^4$, by which the connecting rod N' and lever arm $M^2$ are pivotally connected, is extended at the opposite sides of the lever $M^2$ to form trunnions, and the rod P has threaded on its end adjacent the shaft M a member P' provided with bifurcations $P^2$ adapted to straddle the lever $M^2$. The bifurcations $P^2$, of the member P', are formed with slots $P^3$ open at their lower ends so that when the rod P is in the dotted line position shown in Fig. 7 the trunnion like extensions or ends of the pivot pin $M^4$ are received in the slots $P^3$, and the rod P is operatively connected to the lever arm $M^2$. The rod P may be readily disconnected from the lever arm $M^2$ by merely raising the rod P into the full line position shown in Fig. 7.

In the preferred construction illustrated, the hand mechanism includes a bell crank lever Q, to one arm of which the rod P is pivotally connected. The connecting rod R is pivotally connected at its lower end to the second arm of the bell crank lever Q, and at its upper end is pivotally connected at S' to the operating lever S proper. The lever S is located in the scale office and the bell crank lever Q is located in an offset or bay portion A' of the scale pit. The bell crank lever Q is supported in a bracket-like member Q² which is firmly anchored at the bottom of the scale pit, and the connecting rod R extends in a substantially vertical direction. To insure sufficient freedom of lateral movement, the connecting rod R is not connected directly to the bell crank lever Q, but is pivotally connected at R' to a member Q', which is sleeved on the corresponding arm of the lever Q. The fulcrum or support S³ to which the lever S is pivotally connected at S², is mounted on beams S⁴. As the connecting rod R is relatively long and the lateral movement of the rod in a plane parallel to that in which the section of Fig. 7 is taken, is slight, the spring of the rod R and the looseness of the pivotal connections make it unnecessary in practice to provide any special pivotal connection between the rod R and lever S to accommodate such lateral movement.

The means employed for raising and lowering the rod P to free it from and connect it to the lever arm M² comprises a rock shaft T mounted on pedestals T' and having an arm T² carrying at its free end a roll T³ adapted to engage the rod P and lift it from the dotted line position shown in Fig. 7 into the full line position shown in that figure when the lever arm T² is moved from the dotted into the full line positions of that figure. To rotate the shaft T, the latter is provided with an arm T⁴ connected by a connecting rod T⁵, made adjustable in length by the turnbuckle T⁶, to one arm of a bell crank lever U journaled on the shaft Q³. The second arm of the bell crank lever U is connected to the lower end of a rod U' provided with an operating handle U² at its upper end by means of which the bell crank lever U may be turned on its axis to produce corresponding movements of the shaft T and arm T². The handle U² projects up into the scale office through a guide U³ located between the same pair of beams S⁴ on which the lever mechanism S is mounted.

It will be obvious that the hand operating mechanism described is simple, effective, and reliable, and is conveniently disposed with respect to the scale proper and the office therefor. An important feature of this mechanism consists in the fact that the effective leverage of the lever S increases while the center of the pivot S' is moved from the position shown into the position X, and that the effective leverage is much greater while the pivotal center is moving from the position X to the position X', than when the center is being moved from the position shown in Fig. 7 into the position X. This is as it should be, for during the early stage of the lever movement until the center S' reaches the point X, the effect of the movement is merely to take up lost motion and to bring the plungers of the lifting jacks into effective engagement with the scale platform. During the movement from X to X', the platform is being lifted. The amount of lift necessary to give to the platform proper is very slight, and the leverage is of such character that the scale platform, even when a heavy car is on it, may be readily given the desired movement through the hand lever S. Preferably, the parts are so arranged that the center of pivot S' may be moved beyond the point X' to the point X², whereby the lever S is automatically locked by the pull of the rod R against accidental return movement.

It will be obvious to all those skilled in the art that the relieving gear disclosed is simple, effective, reliable, and well adapted for the purpose for which it is designed. The connections for simultaneously operating the various lifting jacks are so arranged to insure the proper application of power to each jack with a minimum of the lost motion fatal to proper and rapid operation. Any inequality in the shape of the beams E or in the dimensions or settings of individual jacks may be quickly and easily compensated for by inserting or removing one or more of the thin washers J⁵. The relieving gear can with sufficient rapidity be thrown into and out of operation to permit the weighing of any particular cars of a train passing over the scale with the proper velocity to permit rapid but accurate weighing without subjecting the scale levers and bearings to the weight of the cars which it is not desired to weigh. The hand mechanism for operating the relieving gear may be coupled to the latter or disconnected therefrom easily and quickly when necessary or desirable.

While, in accordance with the provisions of the statutes, I have herein described and illustrated the best form of the invention now known to me, it will be obvious to those skilled in the art that changes can be made in the form of the apparatus disclosed without departing from the spirit of my invention, and I do not wish the claims herein made to be limited to the particular embodiment of the invention disclosed more than is made necessary by the state of the art.

Having now described my invention, what I claim as new and desire to secure by Letters Patent, is—

1. In a railway car scale, the combination with the platform and supporting levers therefor, of means for supporting the weight of the platform and its load independently of the levers, comprising a plurality of toggle lifting jacks each having a plunger formed with a central socket in its upper end and a cap piece formed with a stem entering said socket, and washers formed with notches through which the cap stem may be passed whereby the effective length of said plunger may be adjusted by the insertion and removal of washers without the removal of the cap piece, and means engaging the toggle links of the various jacks whereby said jacks may be simultaneously operated.

2. In a railway car scale the combination with a platform and supporting levers therefor, of means for supporting the weight of the platform and its load independently of the levers, comprising a plurality of toggle lifting jacks arranged in pairs at intervals along the length of the scale with one jack of each pair at each side of the scale and with the links of the jacks turning in planes transverse to the length of the scale, a rock shaft extending parallel to the length of the scale, bars connecting the knuckle joints of the links of each pair of jacks, and connections between said bars and said rock shafts.

3. In a railway car scale, the combination with the platform and operating levers therefor, of means for supporting the weight of the platform and its load independently of its levers, comprising a plurality of lifting jacks, a single operating device for simultaneously operating all of said jacks, and connections whereby said device may be interchangeably operated by a power mechanism and by a hand operated mechanism.

4. In a railway car scale, the combination with the platform and supporting levers therefor, of means for supporting the platform and its load independently of said levers, comprising a plurality of lifting jacks, a rock shaft extending longitudinally of said platform, connections between said shaft and said jacks whereby the rotation of said shaft operates all of said jacks, and a lever mechanism including an operating member at one side of the platform for manually rotating said shaft.

5. In a railway car scale, the combination with the platform and supporting levers therefor, of means for supporting the platform and its load independently of said levers, comprising a plurality of lifting jacks, a rock shaft extending longitudinally of said platform, connections between said shaft and said jacks whereby the rotation of said shaft operates all of said jacks, a lever mechanism including an operating member located at one side of the platform for manually rotating said shaft, and a second lever mechanism including an operating member located adjacent the first mentioned operating member for connecting and disconnecting said first mentioned lever mechanism and said shaft.

6. In a railway car scale, the combination with the platform and supporting levers therefor, of means for supporting the platform and its load independently of said levers, comprising a plurality of lifting jacks, a shaft for operating said jacks, connections between said shaft and said jacks, a lever mechanism including a connecting rod for manually actuating said member, said member and connecting rod having cooperative provisions whereby said rod may be detachably connected to, and disconnected from, said member.

7. In a railway car scale, the combination with the platform and supporting levers therefor, of means for supporting the platform and its load independent of said levers, comprising a plurality of lifting jacks, a rock shaft extending longitudinally of said platform, connections between said shaft and said jacks whereby the rotation of the shaft operates all of said jacks, an operating arm secured to said shaft, and a lever mechanism for manually rotating said shaft, said lever mechanism comprising an operating member at one side of the platform, and a connecting rod, said arm and rod being formed, the one with a projection and the other with a hook adapted to take over said projection whereby the arm and rod may be readily connected to and disconnected from each other.

8. In a railway car scale, the combination with the platform and supporting levers therefor, of means for supporting the platform and its load independently of said levers, comprising a plurality of lifting jacks, a rock shaft extending longitudinally of said platform, connections between said shaft and said jacks whereby the rotation of the shaft operates all of said jacks, an operating arm secured to said shaft and a lever mechanism for manually rotating said shaft, said lever mechanism comprising an operating member, at one side of the platform, and a connecting rod, said arm and rod being formed, the one with a projection and the other with a hook adapted to take over said projection whereby the arm and rod may be readily connected to and disconnected from each other, and a second lever mechanism comprising an operating member located adjacent the operating member of the first mentioned lever mechanism and provided with an arm adapted to engage said rod and move it out of engagement with said arm.

9. In a railway car scale, the combination with the platform and supporting levers, of means for lifting the platform off the levers, said means comprising a pivoted arm, a power device connected thereto for oscillating said arm on its pivotal support, and a lever mechanism including a connecting rod, for manually oscillating said arm, said arm and rod being formed, the one with a projection and the other with a hook adapted to take over said projection, whereby said rod and arm may be connected to and disconnected from each other.

10. In a railway car scale, the combination with the platform and supporting levers, of means for lifting the platform off the levers, said means comprising a pivoted arm, a power device connected thereto for oscillating said arm on its pivotal support, and a lever mechanism, including a connecting rod, for manually oscillating said arm, said arm and rod being formed, the one with a projection and the other with a hook adapted to take over said projection, whereby said rod and arm may be connected to and disconnected from, each other, and a lever mechanism for moving said rod to cause the rod and arm to be connected to and disconnected from each other.

ALONZO W. EPRIGHT.

Witnesses:
JOHN H. A. BOUSFIELD,
ADAM LEAKE.